United States Patent [19]

Smith et al.

[11] Patent Number: 4,709,873

[45] Date of Patent: Dec. 1, 1987

[54] DEVICE FOR POSITIONING A TAPE THREADER PIN IN A TAKE-UP REEL

[75] Inventors: David E. Smith, Lafayette; Dennis R. Olmsted; Joseph A. Fryberger, both of Longmont, all of Colo.

[73] Assignee: Aspen Peripherals, Longmont, Colo.

[21] Appl. No.: 872,952

[22] Filed: Jun. 11, 1986

[51] Int. Cl.⁴ .................. G11B 15/66; G11B 23/04; G03B 1/56

[52] U.S. Cl. .......................... 242/195; 242/67.1 R; 242/197; 360/95

[58] Field of Search .................... 242/195, 197–200, 242/67.1 R; 360/93, 94, 95, 92; 226/91, 92

[56] References Cited

U.S. PATENT DOCUMENTS

| 4,027,832 | 6/1977 | Lopata | 242/197 |
| 4,335,858 | 6/1982 | Cranna | 242/195 |
| 4,350,309 | 9/1982 | Richard et al. | 242/68.3 |
| 4,383,660 | 5/1983 | Richard et al. | 242/197 |
| 4,399,936 | 8/1983 | Rueger | 226/92 |
| 4,426,047 | 1/1984 | Richard et al. | 242/197 |
| 4,432,508 | 2/1984 | Inoue et al. | 360/95 X |
| 4,445,154 | 4/1984 | Kihara et al. | 360/95 X |
| 4,452,406 | 6/1984 | Richard | 242/195 |
| 4,477,851 | 10/1984 | Dalziel et al. | 360/95 |
| 4,608,614 | 8/1986 | Rinkleib et al. | 360/95 |

Primary Examiner—John Petrakes
Attorney, Agent, or Firm—Dorr, Carson, Sloan & Peterson

[57] ABSTRACT

A device for positioning a threader pin of a magnetic tape threading mechanism in a tape take-up reel comprises a plate having an axial receiver slot for receiving the threader pin and a biasing means such as a raised leaf spring which protrudes into the receiver slot from a mounting position within a contiguous slot.

7 Claims, 3 Drawing Figures

DEVICE FOR POSITIONING A TAPE THREADER PIN IN A TAKE-UP REEL

BACKGROUND OF THE INVENTION

(1) Field of the Invention

This invention generally relates to tape take-up reels, especially those having openings in their hubs for receiving tape leader blocks which are frequently used in magnetic tape drive systems. More particularly, this invention is concerned with automatically locating tape threader pins in the axis of rotation of these take-up reels so that they can freely rotate to wind and unwind the tape.

(2) Description of the Prior Art

Various devices have been developed for locating tape threader pins and their associated leader blocks in the hubs of tape take-up reels. For example, U.S. Pat. No. 4,350,309 teaches such location by virtue of the fact that the entire leader block is coextensive and otherwise mates with a slot in the hub of the take-up reel. This arrangement also allows the tape, which is attached to the tail end of the leader block, to be wound smoothly around the hub of the reel. Hence the leader block is held in place by the layers of tape which are wound around the hub. This winding action is provided by drive motors which are usually connected directly to take-up reels of this kind. Such motors must be reversible, have high speeds and be capable of quick starts and stops.

In such tape threader devices, location of the threader pin at the axis of rotation of the take-up reel depends upon four factors: an initial proper location of the threader pin within the leader block; the length of the leader block; the length of the hub's receiver slot; and the absence of any disturbances of the threader pin once it is properly located, e.g., a disturbance produced by "backlash" of the threader arm motor. Ideally the threader pin will be located at a position within the leader block which will correspond to the take-up reel's axis of rotation when the leader block is completely and properly located in the hub's receiver slot.

If the leader block is not completely in the receiver slot in the hub, three problems develop. In the first place, a bending force is placed upon the leader block and the threader pin as the reel tries to rotate and overcome the that fact that the threader pin is not centrally positioned on the reel's axis of rotation. In addition, a discontinuity is placed in the hub's surface by the protruding rear end of the leader block. This causes a "tenting" effect in the tape at the discontinuity. Moreover, a great deal of unnecessary vibration, noise and wear, particularly upon the leader block and base of the threader pin, is created when the threader pin's center does not coincide with the take-up reel's axis of rotation. On the other hand, if the front end of the leader block and/or the deepest end of the receiver slot become worn, the leader block will go too far into the receiver slot. The bad end results are the same. Bending forces are placed on the leader block and threader pin, discontinuities, due in this case to "detenting" effects upon the tape, develop on the tape windings and unnecessary vibrations, noise and wear are created.

Moreover, even if the leader block is initially located in the hub receiver slot in an ideal position for the threader pin, it can be easily disturbed during operation of the reel. The most common sources of disturbance are the quick starts and stops of the threader arm's motor. These quick starts and stops create a condition known as "motor backlash". That is to say the gears associated with the motor "recoils" from the forces placed upon them as they are called upon to wind in one direction and then to quickly wind in the opposite direction. Such motor backlash has a tendency to dislocate the threader pin and hence the leader block from its original proper position in the receiver. Any disturbance of the threader pin from an original proper position leads to the same results as an initial failure to attain a proper position—unwanted vibration, noise and wear.

SUMMARY OF THE INVENTION

This invention seeks to minimize problems associated with dislocations of the threader pin from the axis of rotation of the take-up reel with which the threader pin should be aligned. Our invention provides a simple, reliable and automatic mechanism for initially positioning and then maintaining the threader pin at the reel's axis of rotation. This is accomplished without making any design changes in those threader pins, leader blocks or take-up reels currently used in most tape deck systems. That is to say our device can be employed with a wide variety of reels and threader arm mechanisms which deliver the threader pin to the reel. However, this invention is particularly well suited for use in conjunction with the tape threading device disclosed in U.S. patent application Ser. No. 872,931, filed June 11, 1986, and the teachings of this patent application are hereby incorporated into this patent disclosure.

One of the most important features of our device is a plate mounted above the hollow region of the hub of the take-up reel which receives the threader pin and its associated leader block. An adjacent cavity in the plate houses a biasing means such as a leaf spring, raised leaf spring, spring loaded plunger, hydraulically biased plunger, spring loaded ball bearing, etc., which engages the threader pin once it occupies the reel's axis of rotation. The biasing means may reside in its own housing which in turn resides in the adjacent cavity or housing. In the more preferred embodiments of our invention this device cooperates with the overhead rod portion of the threader pin rather than with the leader block.

The plate could have any configuration, but a round configuration is highly preferred. In any case, the plate will contain a receiver slot which extends from an outer edge of the plate to a point beyond the axis of rotation of the take-up reel. The receiver slot receives a threader pin delivered under the action of a motor-driven threader arm such as the one disclosed in the previously noted U.s. patent application Ser. No. 872,931.

A housing cavity for the biasing means lies adjacent to, and partially contiguous with, the plate's receiver slot. The contiguous regions of the slot and the housing cavity are adapted to provide an open space in front of the axis of rotation of the reel through which a raised portion of the biasing means projects. That is to say, the biasing means is housed in the housing cavity and is biased to project into the receiver slot. The rear side of the biasing means serves to contact with and position the threader pin at the axis of rotation of the reel. The housing cavity should be of a size sufficient to receive the biasing means when it is depressed into the housing cavity. This depression takes place when the front of the biasing means is driven down under the force of the incoming threader pin. A similar depression takes place when the rear of the biasing means is driven down under the force of the outgoing threader pin. Again, the incoming and outgoing motions are produced by a motor driven threader arm which supports the threader pin.

In a highly preferred embodiment of this invention, the biasing means is a leaf spring having a flat region and a raised portion. The raised portion projects into the receiver slot in front of the axis of rotation of the take-up reel. Most preferably the raised portion of the leaf spring has a humped contour such that both its frontside and backside will have somewhat rounded contours. Obviously a spring loaded ball or plunger could also be used because they too have these same attributes. Such rounded contours will greatly aid the threader pin's depression of the biasing means. The biasing means is held in place by a keeper which could take various known forms. In a preferred embodiment of this invention, the biasing means housing cavity will also be in the form of a slot which lies adjacent and partially contiguous with the receiver slot. In the case of the leaf spring biasing means, the keeper will most preferably be a block-like piece wedged into a rectangular spring housing slot. Most preferably the leaf spring will have a flat stem portion which the keeper will wedge against the upper part of a rectangular biasing means housing cavity which is not contiguous to the receiver slot.

It should also be noted that the above described plate could also serve as the "hub cap" end of the cylindrical take-up reel. In this case the plate would be round, have the same diameter as the hub of the take-up reel and have its receiver slot aligned with the hollow opening in the cylindrical take-up reel which receives the threader pin and its associated leader block. The device could also serve as a part of a larger threader pin receiver system. For example, it could be located concentrically with a fixed first or exterior plate which serves to "aim" and/or guide the incoming threader pin into the receiver slot of a second or interior plate which contains the reel's axis of rotation. For example, such a system could comprise a first circular plate having a circular center hole for receiving a second circular plate which contains the spring or other biasing means which holds the threader pin in place at the reel's axis of rotation. Since the first plate surrounds the second circular plate, the first plate must also have a slot which is aligned with the receiver slot in the second plate. The slot in the first plate may be rectangular, but preferably it will be somewhat wedge shaped. That is, it will have a wide mouth for receiving the incoming threader pin and a more narrow opening where the threader pin is transferred from the receiver slot in the first plate to the receiver slot in the second plate. Ideally the opening where the incoming threader pin exits the first plate will equal the width of the receiver slot in the second plate. In effect the two devices would present a single aligned slot running radially from the circumference of the first plate, into the second plate to a point just beyond the take-up reel's axis of rotation. Guide means external to the first plate may also be employed to commence guiding the threader pin and/or the leader block into the slot in the outer, first plate. It should be noted that the second plate may be located above and independent of second plate; or it may be affixed to it. For example, the center hole of the first plate and the circumference of the second plate may be associated in a threaded relationship. In another embodiment of this invention, the second circular plate may rotate freely in the hole in the first plate and serve as the hub cap end of the cylindrical hub of the take-up reel. Obviously, in all of these arrangements, the slot of the receiver and the hollow region in the hub of the take-up reel must be coaxial in order to receive the threader pin and its associated leader block and tape.

BRIEF DESCRIPTION OF THE PREFERRED EMBODIMENTS

Figure 1:
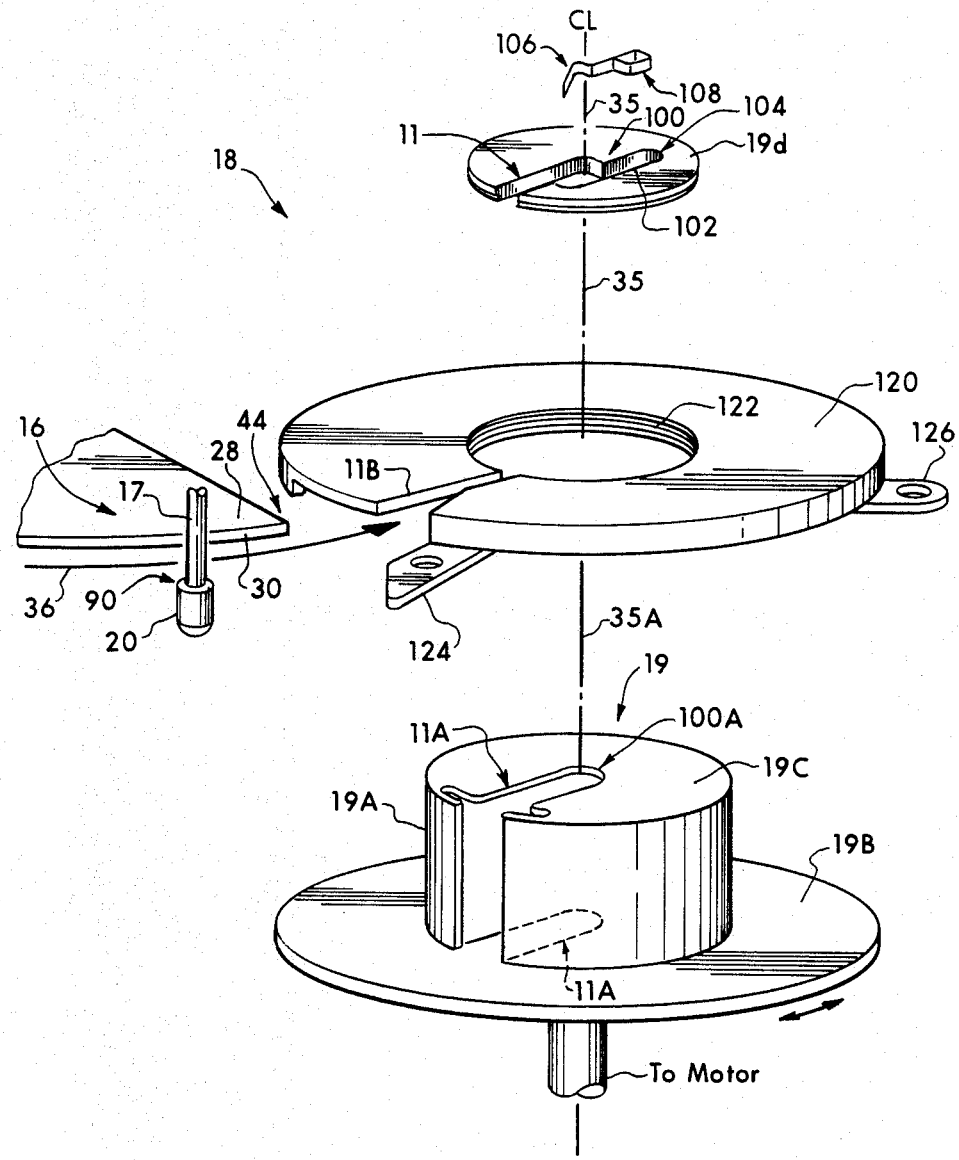
FIG. 1 is an exploded, perspective view of a preferred embodiment of our device for positioning a threader pin. It is shown in relation to certain parts with which it might cooperate.

As previously noted, this device for positioning a tape threader pin in a take-up reel can be used with a wide variety of threader arm and take-up reel mechanisms. For example, it might be used in conjunction with the take-up reel mechanism disclosed in U.S. Pat. No. 4,350,309. Our device is, however, particularly well suited for use in conjunction with the threader pin camming mechanism disclosed in U.S. patent application Ser. No. 872,931. The mechanism taught therein is intended to lead a threader pin and its associated leader block to the take-up reel system. As a matter of convenience, and to emphasize the compatibility of these two devices, the numbering system used in U.S. patent application Ser. No. 872,931 will be used in this patent application in order to designate those elements common to the discussion of both patent applications.

For example, U.S. patent application Ser. No. 872,931 is concerned with delivering a threader pin 16 having a rod portion 17 and a base portion 20 to a generalized take-up reel system 19. The base 20 and rod portion 17 of the threader pin 16 will normally be engaged with a leader block which in turn is attached to the tape being threaded into take-up reel 19. The leader block and its associated tape are not shown. A cam 28 having a camming contour 30 is shown guiding the rod portion 17 of threader pin 16 up to the end point 44 of the cam 28. Thereafter the threader pin 16 continues along a path 36 which ultimately leads into a hollow place 11A in a take-up reel system.

In the device disclosed in this patent disclosure, receiver slot 11 of plate 19d will ultimately receive threader pin 16. For example, FIG. 1 shows a take-up reel 19 having a hub 19A, a bottom base 19B and a top "hub cap" 19C. The take-up reel's axis of rotation is generally indicated along arrow 35A. The take-up reel 19 is attached to a drive motor not shown. Our device for positioning a threader pin at the axis of rotation 35A of the take-up reel 19 has been generally designated as 19d to draw attention to the fact that our device 19d could constitute the "hub cap" part of hub 19A. It could also be independently mounted above a different top 19C of the take-up reel 19. FIG. 1 illustrates a preferred biasing means, a raised leaf spring 106. In another preferred embodiment of this invention, our device 19d could be mounted in cooperation with a first plate 120 which surrounds plate 19d.

In all cases however, our device 19d is comprised of a plate having a threader pin receiver slot 11 and a biasing means housing cavity 102 which houses a biasing means. In FIG. 1, the biasing means is a raised leaf spring 106 which is held in place in cavity 102 by a keeper means 108. In FIG. 1 the raised leaf spring 106 and its keeper 108 also are shown exploded away from the plate 19d. As can be better seen in FIG. 2, the raised leaf spring 106 is intended to protrude from the biasing means housing cavity 102 into slot 11 in the region just in front of the axis of rotation generally indicated by arrows 35 and 35A. Ideally the axis of rotation indicated by arrow 35 of our plate 19d and the axis of rotation 35A of take-up reel 18 should completely coincide.

That is to say, the main purpose of our device 19d is to receive and locate a threader pin 16 at the axis of rotation 35A of the take-up reel 19. To illustrate one embodiment of this general concept, FIG. 1 shows threader pin 16 about to enter slot 11B of a first plate 120. Slot 11B in turn leads to slot 11 of plate 19d. In another preferred embodiment of our invention plate 120 is also provided with thread means 122 to receive plate 19d which can be provided with a compatible threading system. Plate 120 is also shown provided with an externally positioned, wedge shaped guide 124 for guiding the threader pin 16 and/or the leader block into slot 11B. Plate 120 may be anchored to some base portion of the overall tape deck system by mounting tab 126. It should be made clear however, that while use of plate 120 is preferred, it is not necessary. That is to say threader pin 16 could leave cam 28 and directly enter into slot 11 of our device. Now having disclosed the working environment in which our device operates, as well as some of its main features, we can use FIGS. 2 and 3 to more fully describe the essential elements of our device for positioning the threader pin.

Figure 2:
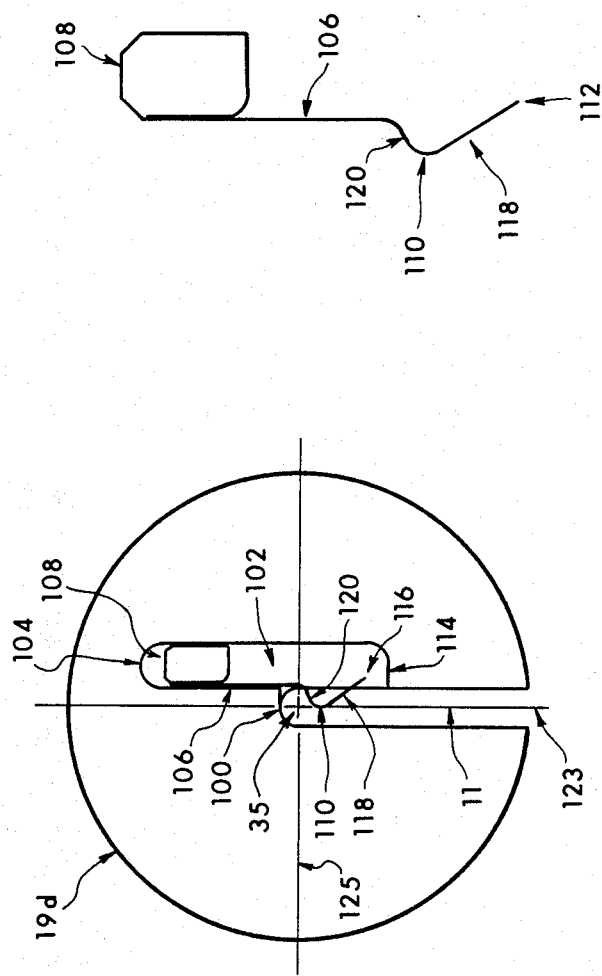
FIG. 2 is a plan view of a preferred embodiment of our device for positioning a threader pin; it is shown with a spring and its keeper in place as well as exploded away from the device so that the raised contour of the spring may be better illustrated.

FIG. 2 is a plan view of a preferred embodiment of our device 19d for positioning a tape threader pin in a take-up reel which is located under the threader pin positioning device 19d. Our device is provided with a receiver slot 11 which receives the rod portion 17 of the threader pin 16 shown in FIG. 1. The latter two items are not shown in FIG. 2. Slot 11 is shown with a vertical center line 123. Slot 11 extends to a point 100 which is beyond horizontal line 125 and hence beyond axis of rotation 35 of the device 19d. Again, this axis of rotation 35 should correspond to the take-up reel's axis of rotation. Obviously slot 11 should be slightly wider than the diameter of rod portion 17 of threader pin 16. The deepest region of slot 11 most preferably will have a rounded configuration to accommodate the round configuration of rod 17 of the threader pin. In effect, the reel will rotate about rod 17 when it is located at the axis of rotation.

A biasing means housing cavity 102, which in this case is a spring housing cavity having a slot-like configuration, is shown lying adjacent to, and partially contiguous with, slot 11. In a preferred embodiment of the device shown in FIG. 2, housing cavity 102 will also have a slot configuration which extends from a rear end 104 to a front end 114. Consequently, the adjacent parts of slots 11 and 102 defines an opening between the two slots. Generally the opening runs from end point 100 of slot 11 to end point 114 of slot 102. Conversely, the rear end of slot 102, extending generally from point 100 on slot 11 to end 104 of slot 102 is not open to slot 11.

A leaf spring 106 is shown mounted in the rear end of slot 102 by means of a keeper means such as block 108 which is wedged into slot 102. Leaf spring 106 has a raised part 110 having a front side 118 and a rear side 120. The raised part 110 of leaf spring 106 extends into slot 11 to about its center line 123. The front tip 112 of leaf spring 106 will preferably reside in an open region 116 in slot 102. This open region 116 should be of sufficient size to receive the entire leaf spring 106 when the raised part 110 of leaf spring 106 is depressed into slot 102 under the action of the incoming and outgoing rod 17 portion of threader pin 16. That is, as rod 17 enters slot 11, it will impinge upon the front surface 118 of leaf spring 106 and depress the entire raised part 110 into slot 102. Similarly, as rod 17 leaves slot 11 it will impinge upon the rear surface 120 of leaf spring 106 and again depress the entire raised part 110 into slot 102.

After incoming threader pin rod 17 is past the raised portion 110 of spring 106, this raised portion 110 will, under its own spring bias, again return to the position shown in FIG. 2. Here it will again partially block slot 11 in the region just in front of the axis 35. More importantly however, in this position, the rear side 120 of spring 106 will impinge upon a portion of the rear circumference of threader pin rod 17. Thus the spring's occupation of this region just in front of the axis of rotation 35 will serve to bias rod 17 at axis of rotation 35 and thereby overcome any disturbing effects upon the threader pin's alignment with the take-up reel's axis of rotation whenever the threader arm's motor "backlashes" under those forces created by quick stops and starts.

Figure 3:
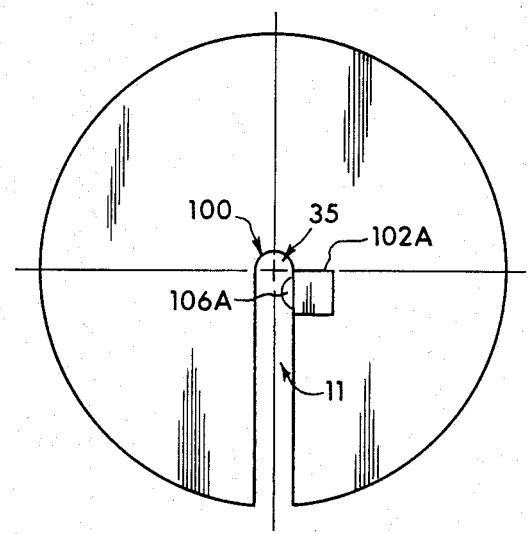
FIG. 3 illustrates one of a number of alternative biasing means which could be employed in our device.
Figure 3:
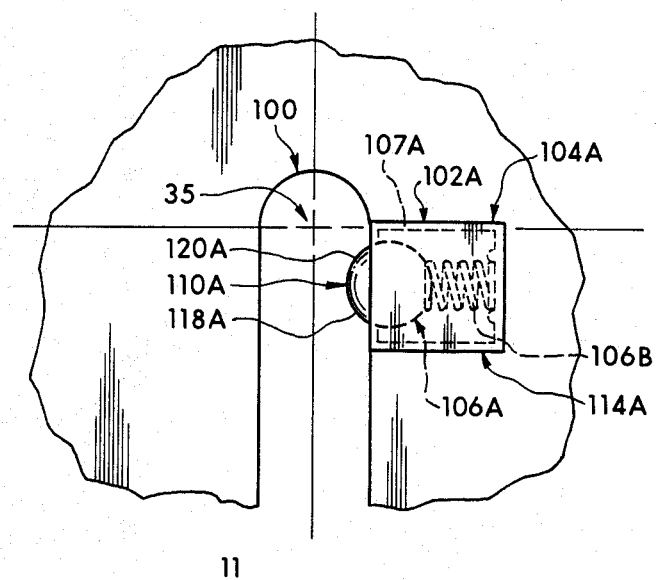

FIG. 3 illustrates one of the many alternative ways in which a biasing means could perform the same function as the raised leaf spring shown in FIGS. 1 and 2. In FIG. 3 the biasing means is ball 106A under an upward biasing force provided by spring 106B. The ball 106A is contained in a housing 107A which in turn is positioned in a biasing means housing cavity 102A. The space between the housing 107A and the housing cavity 102A is shown greatly exaggerated for purposes of pictorial clarity. Those skilled in the art will appreciate that best results will be achieved when the housing 107A fits snugly into the housing cavity 102A. The housing cavity 102A extends from its front surface 114A to its back surface 104A. But, unlike slot 102 of FIG. 2, housing cavity 102A of FIG. 3 does not extend beyond the end 100 of slot 11. However, in both cases, the partially contiguous relationship of the respective slots and housing cavities defines an opening through which the biasing means protrudes in the region just in front of axis of rotation 35. FIG. 3 depicts the ball 106A protruding from housing cavity 102A into slot 11. Hence the ball 106A acts in a manner analogous to the raised leaf spring shown in FIG. 2. For example, the ball 106A has a humped region 110A which protrudes to about the center of slot 11. It also has a slope front side 118A which is depressed by an incoming threader pin 16 not shown, and a sloped rear side 120A which is depressed into the housing 107A and hence into the housing cavity 102A by the outgoing threader pin. Also in the manner of leaf spring of FIG. 2, the rear side 120A of ball 106A serves to position the theader pin at the axis 35 of the take-up reel.

Those skilled in the art will of course appreciate that biasing forces provided by means other springs (e.g., hydraulic, air pressure, etc.) also could be employed in this device. However, for reasons of mechanical simplicity and costs, the use of springs is preferred.

Although three preferred embodiments of our threader pin positioning device 19d have been described in conjunction with FIGS. 1, 2 and 3, those skilled in the art also will appreciate that the precise location of the threader pin with respect to the axis of rotation of the take-up reel is one of the main objects of our device. In this regard, the device is particularly useful in compensating for any disturbing effects of threader arm motor backlash. It should also be noted that while the present invention was described in the general context of take-up reels for magnetic tapes, this device could also be used in conjunction with many other kinds of information carrying tapes. For example, it could just as well be employed in conjunction with optical storage and surface deformation tape systems.

Thus having disclosed our invention, we claim:

1. A mechanism for positioning a tape threader pin at the axis of rotation of a tape take-up reel adapted to receive said tape threader pin in association with a tape leader block, said mechanism comprising:
   a plate having a receiver slot which extends from an outer edge of the plate to a point beyond the axis of rotation of the take-up reel and a biasing means housing cavity having an open region in front of the axis of rotation of the take-up reel, said biasing means housing cavity being of sufficient size to receive a biasing means depressed into the housing cavity by the threader pin as it enters and leaves the receiver slot; and
   a biasing means having a raised region which projects from the biasing means housing cavity into the receiver slot at a position in front of the axis of rotation of the take-up reel, said biasing means further comprising means for keeping the biasing means in said housing cavity.

2. A mechanism for positioning a tape threader pin at the axis of rotation of a tape take-up reel adapted to receive said tape threader pin in association with a tape leader block, said mechanism comprising:
   a plate having a receiver slot which extends from an outer edge of the plate to a point beyond the axis of rotation of the take-up reel and a spring housing cavity having an open region in front of the axis of rotation of the take-up reel, said spring housing cavity being of sufficient size to receive a leaf spring when it is depressed into the spring housing cavity by the threader pin as it enters and leaves the receiver slot; and
   a leaf spring having a raised region which projects from the spring housing cavity into the receiver slot at a position in front of the axis of rotation of the take-up reel, said spring further comprising means for keeping the spring in said spring housing cavity.

3. A mechanism for positioning a tape threader pin at the axis of rotation of a tape threader pin in association with a tape leader block, said mechanism comprising:
   a circular plate having a receiver slot which extends radially from the circumference of the circular plate to a point beyond the axis of rotation of the take-up reel and a spring housing slot which lies parallel to, and partially contiguous with, the receiver slot such that an open region is created between the two slots in front of the axis of rotation of the take-up reel, said spring housing slot also being of sufficient size to receive a leaf spring when it is depressed into the spring housing slot by the threader pin as it enters and leaves the receiver slot; and
   a leaf spring having a raised center part which is biased from the spring housing slot into the receiver slot in front of the axis of rotation of the take-up reel, said spring further comprising a block-like keeper which can be wedged into said spring housing slot.

4. A mechanism for positioning a tape threader pin at the axis of rotation of a tape take-up reel adapted to receive said tape threader pin in association with a tape leader block, said mechanism comprising:
   a first circular plate having a circular center hole for receiving a second circular plate, and wherein the first circular plate is provided with a first receiver slot running radially from the circumference of the first circular plate to the circular center hole;
   a second circular plate located in the center hole of the first circular plate, said second circular plate further comprising (1) a second receiver slot which extends, as an extension of the first receiver slot of the first circular plate, radially from the circumference to the second circular plate to a point beyond the axis of rotation of the take-up reel and (2) a spring housing slot which lies parallel to and partially contiguous with the second receiver slot of the second circular plate such that an open region is created between the two slots in front of the axis of rotation of the take-up reel, and wherein said spring housing slot is of sufficient size to receive a leaf spring when it is depressed into the spring housing slot by the threader pin as it enters and leaves the second receiver slot; and
   a leaf spring having a raised center region which is biased from the spring housing slot into the second receiver slot in front of the axis of rotation of the take-up reel, said spring being further provided with a keeper which can be wedged into said spring housing slot.

5. The mechanism of claim 4 which further comprises a tape leader guide which directs the threader pin into the first receiver slot.

6. A tape take-up reel mechanism which positions a tape threader pin at the take-up reel's axis of rotation, said mechanism comprising:
   a powered take-up reel having a generally cylindrical hub about which a tape is wound, said hub further comprising a hollow region which extends into the hub past the take-up reel's axis of rotation and which is of sufficient size to receive the threader pin and an associated leader block;
   a first circular plate having a circular center hole and which is concentrically mounted with the take-up reel's axis of rotation and wherein the first circular plate is provided with a first receiver slot running radially from the circumference of the first circular plate to its circular center hole;
   a second circular plate which fits into the center hole of the first circular plate, said second circular plate further comprising (1) a second receiver slot which is aligned with the first receiver slot of the first circular plate and which extends radially from the circumference of the second circular plate to a point beyond the axis of rotation of the take-up reel and (2) a spring housing slot which lies parallel to and partially contiguous with the second receiver slot such that an open region is created between the two slots in front of the axis of rotation of the take-up reel, and wherein said spring housing slot is also of sufficient size to receive a leaf spring when it is depressed into the spring housing slot by the threader pin as it enters and leaves the second receiver slot; and a leaf spring having a raised center region which is biased from the spring housing slot into the second receiver slot in front of the axis of rotation of the take-up reel, and wherein said spring being is further provided with a keeper which can be wedged into said spring housing slot.

7. The mechanism of claim 6 which further comprises an externally projecting tape leader guide which directs the threader pin into the first receiver slot.

* * * * *